United States Patent Office 3,594,346
Patented July 20, 1971

3,594,346
POLYAMIDES STABILISED AGAINST
DEGRADATION BY LIGHT
Karl Heinz Hermann, Krefeld-Bockum, August Bockmann, Krefeld, Hans Rudolph, Krefeld-Bockum, and Walter Bockmann, Krefeld-Uerdingen, Germany, assignors to Farbenfabriken Bayer Aktiengesellschaft, Leverkusen, Germany
No Drawing. Filed May 24, 1968, Ser. No. 731,716
Claims priority, application Germany, June 9, 1967, F 52,642
Int. Cl. C08g 51/62
U.S. Cl. 260—45.75                                         5 Claims

ABSTRACT OF THE DISCLOSURE

Polyamides, stabilized against degradation by light, containing a combination of manganese compounds and phosphorous compounds of the general formula

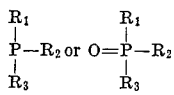

wherein $R_1$, $R_2$, and $R_3$, which may be different or not, represent alkyl, cycloalkyl, aralkyl, aryl, alkoxy, cycloalkoxy, aralkoxy or aryloxy radicals.

---

The present invention relates to polyamides which are stabilised against degradation by light containing a combination of manganese compounds and certain phosphorous compounds as stabilisers and to a process for their preparation.

Shaped articles made of polyamides which have been made by polymerisation of diamines and dicarboxylic acids or of aminocarboxylic acids or their lactams, for example, filaments, bristles or foils, are damaged by the action of light. The light has the effect of reducing the relative viscosity of the polyamide and the mechanical strength and stretching properties are impaired. This sensitivity to light is especialy high in polyamides which contain inorganic pigments such as $TiO_2$, as matting agents or dyes.

Numerous stabilisers have therefore been proposed for improving the resistance of polyamides to light. Manganese compounds such as the oxalate, hypophosphite, borate, silicate, acetate, phosphate, polyphosphate complexes, and adipate are reported to be especially effective light stabilisers for polyamides. The manganese compounds previously used have the disadvantage that they decompose during polymerisation to form manganese dioxide, which causes discolouration of the polyamide. Their electrolytic character may also cause agglomeration and precipitation of the pigment that is finely dispersed in the polyamide-forming starting material, this agglomeration and precipitation interferes with the working up of the polyamide to form filaments. The manganese compounds may also precipitate from the polyamide melt in the course of the polymerisation in the form of moderately large crystals which cause filter blockages during spinning and other difficulties.

It is an object of this invention to provide polyamides, stabilised against degradation by light, which do not show the disadvantages discussed above.

This object is accomplished by a polyamide, stabilised against degradation by light, containing, as stabiliser, a combination of (a) a manganese compound in such a quantity that 0.0001 to 0.01% by weight, based on the polyamide, of a manganese are present and (b) 0.0001 to 0.1% by weight, based on the polyamide, of a phosphorous compound of the general formula

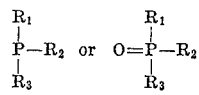

wherein $R_1$, $R_2$ and $R_3$, which may be different or not, represent substituted or unsubstituted alkyl, cycloalkyl, aralkyl, aryl, alkoxy, cycloalkoxy, aralkoxy or aryloxy radicals, the atomic ratio of P and Mn in said combination being from 0.5 to 10.

It is a further object of this invention to provide a process for the production of polyamides, stabilised against degradation by light, which comprises adding to the polyamides or to the polyamides forming starting mixture a combination of (a) a manganese compound and
(b) a phosphorous compound of the general formula

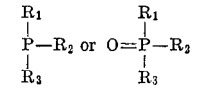

wherein $R_1$, $R_2$, and $R_3$, which may be different or not, represent substituted or unsubstituted alkyl, cycloalkyl, aralkyl, aryl, alkoxy, cycloalkoxy, aralkoxy or aryloxy radicals.

Examples of phosphorous compounds that are suitable according to the invention are triphenylphosphine, tritolylphosphine, phenyldimethylphosphine, tributylphosphine, tricyclohexylphosphine, triisopropylphosphine, tris - β - cyanoethylphosphine, triphenylphosphite, tris-nonylphenylphosphite, tridecylphosphite, didecylphenyl-phosphite, tris-β-chloroethylphosphite, triphenylphosphine oxide, tributylphosphine oxide and tricyclohexylphosphine oxide.

The manganese compounds used are preferably manganese-II salts of inorganic and organic acids, for example, $MnSO_4$, manganese acetate, manganese oxalate and manganese stearate, the manganese-II-halides, $MnCl_2$, $MnBr_2$ and $MnI_2$ being preferred. The manganese compounds are advantageously used in quantities such that the polyamide contains 0.0001 to 0.01% by weight, preferably 0.0002 to 0.005% by weight, based on the polyamide, of manganese.

The phosphorous compounds are advantageously added in an amount of 0.0001 to 0.1% by weight, preferably 0.0005 to 0.01% by weight, based on the polyamide, and the atomic ratio of P:Mn may be between 0.5 and 10 and is preferably between 1 and 5.

The combinations of manganese compounds and phosphorous compounds according to the invention are either mixtures of the components or stable, crystalline or liquid, addition compounds of the formula

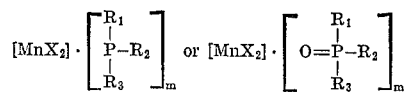

wherein X represents a halogen atom, $m$ is 1 or 2, and $R_1$, $R_2$ and $R_3$ represent the same or different substituted or unsubstituted alkyl, cycloalkyl, aralkyl, aryl, alkoxy, cycloalkoxy, aralkoxy or aryloxy radicals.

The following are examples of such addition compounds:

$$MnBr \cdot 2[(C_6H_5)_3P=O]$$
$$MnCl_2 \cdot 2[(C_6H_5)_3P=O]$$
$$MnI_2 \cdot 2[(C_6H_5)_3P=O]$$
$$MnI_2 \cdot 2[(C_6H_5)_3P]$$
$$MnCl_2 \cdot 2[(C_6H_5)_3P]$$
$$MnCl_2 \cdot [(C_{10}H_{21}-O)_3P]$$
$$MnI_2 \cdot 2[(C_4H_9)_3P=O]$$
$$MnCl_2 \cdot [(Cl-CH_2-CH_2-O)_3P]$$

These addition compounds can easily be prepared by methods described in the literature, for example, by reacting manganese-II-halides with the corresponding phosphorous compounds (J. Chem. Soc., 1961, 3735; Chem. Abs. 56, 13783 C) and are readily soluble in organic solvents such as butanol, methylene chloride, dimethylformamide, toluene or acetone as well as in monomeric lactams, for example, caprolactam.

The stabiliser combination may be added to the polyamide-forming starting mixture before polymerisation or polycondensation, and the polymerisation may then be carried out in known manner either continuously or intermittently.

Alternatively, the stabilisers, either separately or together, or if desired in the form of a concentrate in the polyamide, may be mixed with the polyamide melt during or after polymerisation or polycondensation, using known mixing apparatus such as, extruders, kneaders, or stirrers.

Polyamides are here understood to mean compounds which can be prepared by polymerisation of lactams or by polycondensation of aminocarboxylic acids or of diamines and dicarboxylic acids.

In addition to the stabilisers, the polyamides may also contain the usual additives such as pigments, dyes, heat stabilisers, optical brightening agents, crystallisation promoters etc.

Polyamides which have been stabilised in this way, especially against degradation by light, are eminently suitable for the production of filaments, for example, monofilament or multifilament silk, fibres or foils.

The following example is to further illustrate the invention without limiting it.

EXAMPLE 110 kg. of caprolactam are polycondensed in the usual manner in a pressure autoclave at 260° C. with the addition of 2 kg. of water, 0.3 kg. of $TiO_2$ (anatase modification) in the form of an aqueous dispersion, 0.2 kg. of acetic acid as chain breaking reagent and various manganese compounds (as given in Table I). The polyamide melt is then spun into a filament of about 3 mm. diameter, granulated, freed from monomeric constituents by boiling with water, and dried. The finished product is investigated for pigment distribution as follows:

From 10 granulates picked out at random, a disc of about 3 mm. in diameter and 0.01 mm. in thickness is cut out by means of a suitable cutting device, for example a microtome. These microtome sections are then inspected with a measuring microscope with 100 times magnification under an oblique direct light and the pigment particles or agglomerates which have a maximum size of 5 to $10\mu$, 10 to $15\mu$, 15 to $20\mu$, etc., respectively are counted. The results are summarised in Table 1. The polymers are spun into silk with 90/25 den., the melt being filtered through a wire gauze of $10\mu$ mesh before entering into the spinning dyes. In the case of samples 9, 10 and 11, the pressure in front of the wire filter gauze rapidly rises during spinning, so that satisfactory spinning becomes no longer possible. When the filter is taken apart, it is found to be badly blocked with a material which according to analytical investigation consists of 10 to 30% $TiO_2$ and 5 to 30% Mn in the form of an inorganic compound.

In the case of Samples 1 to 8, the pressure in front of the wire filter gauze remains practically constant during spinning and no disturbances occur in spinning. When the filter is removed, it is found to be on the whole clean. To determine the stability to light, the filaments are irradiated with a 1,500 watt xenon arc lamp for 200 hours; the loss in mechanical strength resulting from these irradiations is shown in Table 2.

TABLE I

| Serial Number | Manganese compound | Grams | Mn content in finished product in p.p.m. | Colour of the polyamide | Pigment distribution | | | |
|---|---|---|---|---|---|---|---|---|
| | | | | | $5-10\mu$ | $10-15\mu$ | $15-20\mu$ | $>20\mu$ |
| 1 | MnCl·2 triphenylphosphine oxide | 31.0 | 25 | Pure white | | | | |
| 2 | $MnBr_2$·2 triphenylphosphine oxide | 35.0 | 25 | ....do.... | | | | |
| 3 | $MnI_2$·2 triphenylphosphine | 37.9 | 25 | ....do.... | | | | |
| 4 | $MnCl_2$·2 tributylphosphine oxide | 29.6 | 25 | ....do.... | 1 | | | |
| 5 | $MnCl_2$·2 tridecylphosphite | 32.6 | 25 | ....do.... | 1 | | | |
| 6 | $MnCl_2 \cdot 4H_2O$ / Triphenylphosphine oxide | 9.0 / 20.0 | 25 | ....do.... | 2 | | | |
| 7 | $MnCl_2 \cdot 4H_2O$ | 9.0 | 25 | Slightly brownish | 8 | 2 | 1 | 1 |
| 8 | Mn acetate·$4H_2O$ | 11.1 | 25 | ....do.... | 2 | | | |
| 9 | $MnSO_4 \cdot H_2O$ | 7.7 | 25 | Almost pure white | 4 | 1 | 2 | |
| 10 | $Mn(H_2PO_4)_2 \cdot 5H_2O$ | 15.4 | 25 | Pure white | 4 | | 1 | |
| 11 | $Mn(H_2PO_2)_2 \cdot H_2O$ | 9.2 | 25 | ....do.... | 6 | 1 | | |

TABLE 2

| Serial number: | Loss of starting values in percent | |
|---|---|---|
| | Ultimate tensile strength | Elongation on tearing |
| 1 | 27 | 38 |
| 2 | 25 | 42 |
| 3 | 24 | 36 |
| 4 | 30 | 40 |
| 5 | 22 | 34 |
| 6 | 28 | 39 |
| 7 | 34 | 46 |
| 8 | 31 | 40 |
| 9 | 36 | 50 |
| 10 | 30 | 42 |
| 11 | 28 | 40 |

What we claim is:

1. A polyamide, stabilized against degradation by light, containing, as stabilizer, a combination of
   (a) a manganese II salt selected from the group consisting of sulfate, acetate, oxalate, stearate, chloride, bromide and iodide salts in such a quantity that 0.0001 to 0.01% by weight, based on the polyamide, of manganese is present and
   (b) 0.0001 to 0.1% by weight, based on the polyamide, of a phosphorous compound of the general formula

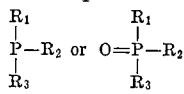

wherein $R_1$, $R_2$ and $R_3$, which may be different or not, are substituted or unsubstituted alkyl, cycloalkyl, aralkyl, aryl, alkoxy, cycloalkoxy, aralkoxy or aryloxy radicals; the atomic ratio of P and Mn in said combination being from 0.5 to 10.

2. The stabilized polyamide of claim 1 wherein the manganese II salt is a manganese II halide.

3. The stabilized polyamide of claim 1 wherein the phosphorous compound is triphenylphosphine oxide.

4. The stabilized polyamide of claim 1 wherein the phosphorous compound is triphenyl phosphine.

5. A polyamide, stabilised against degradation by light, containing, as stabiliser, an addition compound of the general formula

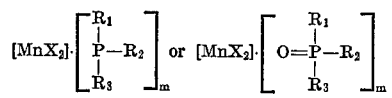

wherein X represents a halogen atom, $m$ is 1 or 2, and $R_1$, $R_2$ and $R_3$, which may be different or not, represent substituted or unsubstituted alkyl, cycloalkyl, aralkyl, aryl, alkoxy, cycloalkoxy, aralkoxy or aryloxy radicals, said addition compound being present in such an amount that 0.0001 to 0.01% by weight, based on the polyamide, of manganese are present.

References Cited

UNITED STATES PATENTS

| | | | |
|---|---|---|---|
| 2,510,777 | 6/1950 | Gray | 260—45.7 |
| 2,705,227 | 3/1955 | Stamatoff | 260—45.7 |
| 2,837,494 | 6/1958 | Gilbert et al. | 260—45.7 |
| 2,887,462 | 5/1959 | Van Oot | 260—45.75 |
| 3,334,064 | 8/1967 | Bailey | 260—45.7 |
| 3,428,597 | 2/1969 | Di Kotter et al. | 260—45.75 |
| 3,341,625 | 9/1967 | Gillham et al. | 260—45.7 |

DONALD E. CZAJA, Primary Examiner

V. P. HOKE, Assistant Examiner

U.S. Cl. X.R.

260—37, 45.7, 45.9